US007012341B2

(12) United States Patent
Matsubara

(10) Patent No.: US 7,012,341 B2
(45) Date of Patent: Mar. 14, 2006

(54) ELECTRIC POWER GENERATOR EQUIPMENT

(76) Inventor: Hideo Matsubara, 1-1-101 Kita 5-jyo Nishi 29-Chome, Chuo-ku, Sapporo-shi, Hokkaido (JP)

( * ) Notice: Subject to any disclaimer, the term of this patent is extended or adjusted under 35 U.S.C. 154(b) by 43 days.

(21) Appl. No.: 10/973,417

(22) Filed: Oct. 27, 2004

(65) Prior Publication Data

US 2006/0017292 A1   Jan. 26, 2006

(30) Foreign Application Priority Data

Jul. 21, 2004   (JP)   ............................. 2004-212403

(51) Int. Cl.
 *F03B 13/10*   (2006.01)

(52) U.S. Cl. ............................. 290/43; 290/54; 290/52; 290/42; 310/11; 405/78

(58) Field of Classification Search ................. 290/54, 290/53, 52, 43, 42; 310/11; 505/78
See application file for complete search history.

(56) References Cited

U.S. PATENT DOCUMENTS

| 4,241,283 A | * | 12/1980 | Storer, Sr. | ..................... 290/54 |
| 4,804,855 A | * | 2/1989 | Obermeyer | ................... 290/54 |
| 5,136,173 A | * | 8/1992 | Rynne | ......................... 290/53 |

* cited by examiner

*Primary Examiner*—Darren Schuberg
*Assistant Examiner*—Iraj A. Mohandesi
(74) *Attorney, Agent, or Firm*—Berenato, White & Stavish, LLC

(57) ABSTRACT

In order to obtain an electric power generator equipment capable of efficiently generating electric power and capable of reducing cost, without a water bath and constructive maximum height, the electric power generator equipment comprises a floating member for floating on a water surface, a power generator installed on an upper surface of the floating member, a cage suspended from a lower end of the floating member and held to a water bottom, a pair of floating bodies positioned in the cage which is separated, a wire rope whose both ends are fixed to the cage, and an air filling-up apparatus for filling up air to each of the floating bodies. The wire rope is winded to a pulley installed an end portion of each floating body and is winded to a pulley installed on the power generator.

8 Claims, 17 Drawing Sheets

(a)

(b)

(a)

(b)

(c)

(a)

(b)

(a)

(b)

(a)

(b)

(a)

(b)

ELECTRIC POWER GENERATOR EQUIPMENT

CROSS-REFERENCE TO RELATED APPLICATIONS AND CLAIM TO PRIORITY

This application claims priority according to 35 U.S.C. § 119 to patent application number 2004-212403, filed Jul. 21, 2004 in Japan, the disclosure of which is incorporated herein by reference.

FIELD OF THE INVENTION

The present invention relates to electric power generator equipment, and more particularly, to electric power generator equipment having a pair of floating bodies which are positioned in water. The electric power generator equipment alternatively fills up and exhausts air of the floating bodies and makes the floating bodies alternatively move up and down by buoyant force, in order to carrying out an electric power generation.

BACKGROUND OF THE INVENTION

In general, each of hydraulic power equipment, thermal power equipment, and atomic power equipment are widely known as electric power generator equipment. Each of the hydraulic power equipment, the thermal power equipment, and the atomic power equipment grow in stature recently. As a result, destruction of environment and pollution problem may occur on large-scale and serious problem may occur socially.

Under the circumstances, electric generator equipment using natural energy is becoming pervasive instead of the hydraulic power equipment, the thermal power equipment, and the atomic power equipment. The electric power generator equipment using natural energy hardly brings about destruction of environment and pollution problem and is realized as photovoltaic power generation, wind power generation, geothermal power generation, tidal power generation, or the like.

However, the location is defined and equipment cost becomes expensive in the electric power generator equipment using natural energy. As a result, it is difficult to dissolve the problem of cost versus actual performance.

Under the circumstances, the present applicant proposes electric power generator equipment for making floating bodies move up and down by buoyant force which is obtained by filling up air in the floating bodies and exhausting air from the floating bodies positioned in water bath, in order to carry out an electric power generation (Tokugan No. 2004-30133 specification). The electric power generator equipment has no definition of the location and has a simple structure. Furthermore, the electric power generator equipment has no pollution and the generating cost is comparatively cheap.

It is necessary to have the water bath in the above-mentioned electric power generator equipment proposed by the present applicant, inasmuch as the electric power generator equipment has a structure in which air is filled up in the floating bodies and air is exhausted from the floating bodies in the water bath. The construction cost is expensive in the water bath and the cost is expensive on saving water in the water bath.

Furthermore, there is a maximum height to the water bath. As a result, it is difficult to efficiently generating electric power in the above-mentioned electric power generator equipment.

SUMMARY OF THE INVENTION

In order to taking the above-mentioned problems into consideration, it is an object of the present invention to provide an electric power generator equipment capable of efficiently generating electric power and capable of reducing cost, without a water bath and constructive maximum height, in the electric power generator equipment for making a pair of floating bodies alternatively move up and down by buoyant force, in order to carrying out an electric power generation.

In order to accomplish the above-mentioned object, according to a first aspect of the present invention, there is provided an electric power generator equipment comprising a floating member for floating on a water surface, a power generator installed on an upper surface of the floating member, a cage suspended from a lower end of the floating member and held to a water bottom, a pair of floating bodies positioned in the cage which is separated, a wire rope whose both ends are fixed to said cage, the wire rope being winded to a pulley installed an end portion of each floating body and being winded to a pulley installed on the power generator, and an air filling-up apparatus for filling up air to each of the floating bodies. The air filling-up apparatus fills up the air to the floating body when the floating body is positioned at a lower portion of the cage. The air is exhausted from the floating body when the floating body is positioned at an upper portion of the cage. The pair of floating bodies alternatively goes up and down continuously. The power generator rotates to generate an electric power by movement of the wire rope based on ascent and descent of the floating bodies.

Therefore, it is unnecessary for the electric power generator equipment of the present invention to have the water bath and it is possible to reduce the cost in case where the electric power generator equipment is positioned at lake, the sea, the impoundment, the reservoir, or the like. Furthermore, it is possible to ensure the sufficient depth of water without the constructive definition of height and it is possible to efficiently carry out the power generation.

According to a second aspect of the present invention, the power generator has an one-way clutch.

Accordingly, it is possible to make the rotating axis of the power generator rotate towards a predetermined direction by the one-way clutch and it is possible to efficiently carry out the power generation.

According to a third aspect of the present invention, a compressed air steel cylinder is connected to the air filling-up apparatus.

Therefore, it is possible to supply the air from the compressed air steel cylinder to the air filling-up apparatus.

According to a fourth aspect of the present invention, a compressor is connected to the compressed air steel cylinder.

Therefore, it is possible to supply the air from the compressor to the compressed air steel cylinder.

According to a fifth aspect of the present invention, the air filling-up apparatus has an opening portion for use in filling up air that is always closed by a biased rotating body. The opening portion opens when the rotating body rotates in accordance with drop of the floating body. The air filling-up apparatus fills up the air to the floating body.

Therefore, it is possible to automatically fill up the air to the floating bodies in accordance with the drops of the floating bodies.

According to a sixth aspect of the present invention, The air filling-up apparatus has an opening portion for use in filling up air that is always closed by a cover body which is biased upwardly. The opening portion opens when a cover pushing bar extending from said floating body to a vertical direction pushes down the cover body in accordance with drop of the floating body. The air filling-up apparatus fills up the air to the floating body.

Therefore, it is possible to automatically fill up the air to the floating bodies in accordance with the drops of the floating bodies.

According to a seventh aspect of the present invention, the air filling-up apparatus has an flow path for use in filling up air that is always closed by a direction-changing valve. The flow path opens when a changing lever of the direction-changing valve is changed in accordance with drop of the floating body. The air filling-up apparatus fills up the air to the floating body.

Therefore, it is possible to automatically fill up the air to the floating bodies in accordance with the drops of the floating bodies.

According to an eighth aspect of the present invention, the floating body comprises an exhausting portion positioned at an upper end of the floating body for exhausting the air from the floating body. The exhausting portion has an exhausting opening which is always closed by a cover body which is biased upwardly. The exhausting opening is opened when a cover pushing bar extending from a lower surface of an upper portion of the cage to a vertical direction pushes down the cover body in accordance with ascent of the floating body. The air is exhausted from the floating body.

Therefore, it is possible to automatically exhaust the air from each of the floating bodies in accordance with ascent of each floating body.

BRIEF DESCRIPTION OF THE DRAWINGS

FIG. 4($b$) is a sectional view along B—B line of FIG. 2;

FIG. 5($b$) is a longitudinal sectional view for illustrating a exhausting portion of the floating body shown in FIG. 1;

FIG. 5($c$) is a longitudinal sectional view for illustrating an operation of the exhausting portion of the floating body shown in FIG. 1;

FIG. 6($b$) is a cross-sectional view of the air-filling apparatus of FIG. 6($a$) in a second position;

FIG. 7($b$) is a longitudinal sectional view of the air filling-up apparatus illustrated in FIGS. 6($a$) and ($b$), in a condition of notching a part;

FIG. 8($b$) is an elevational view of the power generator and the gears of FIG. 1, in a condition of notching a part;

FIG. 14($b$) is an enlarged elevational view partially in section of an opening portion of the air filling-up apparatus illustrated in FIG. 14($a$), in a condition of notching a part;

FIG. 14($c$) is an enlarged elevational view partially in section of the air filling-up apparatus illustrated in FIG. 14($a$), in a condition of notching a part;

FIG. 16($b$) is an enlarged elevational view of the air filling-up apparatus illustrated in FIG. 16($a$)

DETAILED DESCRIPTION OF THE PREFERRED EMBODIMENT(S) OF THE INVENTION

With reference to the drawings, description will be made as regards an embodiment according to the present invention.

Figure 1:
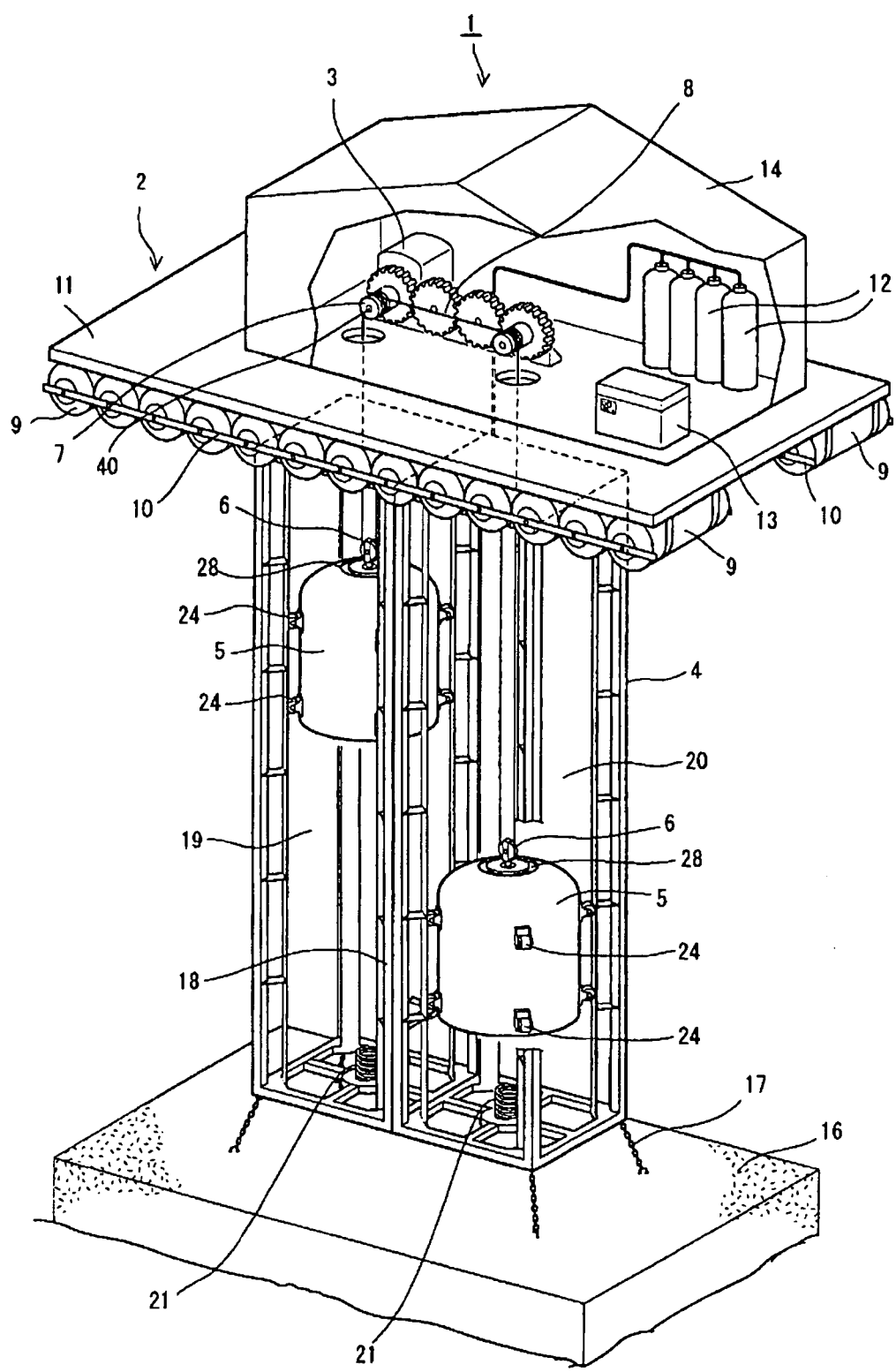
FIG. 1 is a perspective view in condition of notching a part, in an electric power generator equipment of the present invention.
Figure 2:
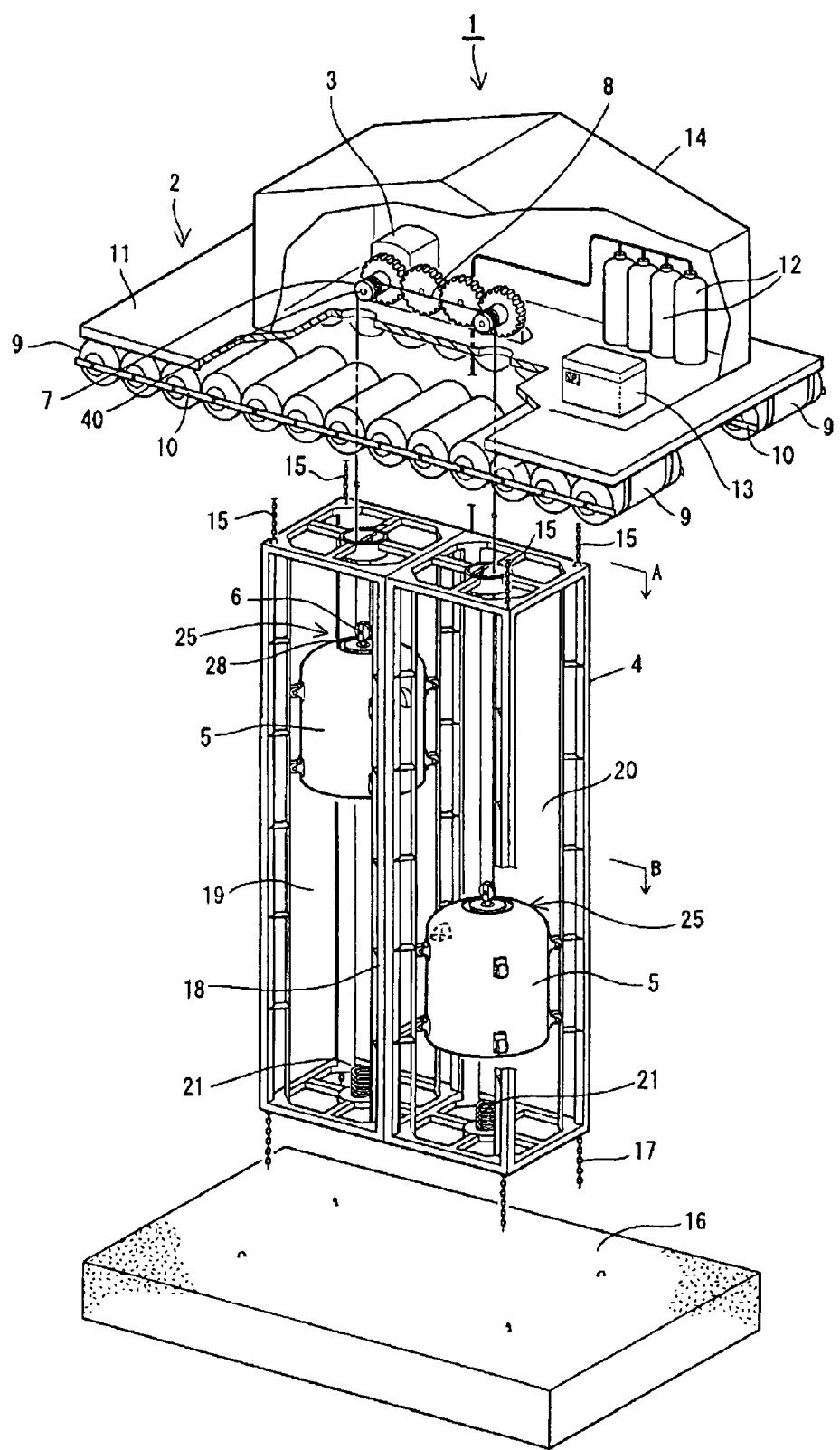
FIG. 2 is a perspective view in condition of notching a part, in an electric power generator equipment of the present invention.

In FIGS. 1 and 2, reference numeral 1 represents an electric power generator equipment of the present invention. The electric power generator equipment 1 comprises a floating member 2, a power generator 3, cage 4, a pair of hanging bell shaped floating bodies 5, a wire rope 8, and an air filling-up apparatus (not shown). The floating member 2 floats on a water surface of a lake, sea, an impoundment, a reservoir, or the like. The power generator 3 is installed on a upper surface of the floating member 2. The cage 4 is hung on a lower surface of the floating member 2 and is held on a water bottom. The cage 4 is separated into left and right sections and the floating bodies 5 are installed in the left and the right sections, respectively. The both ends of the wire rope 8 is fixed on the cage 4 and is winded to pulleys which are installed on an upper ends of the floating bodies 5, respectively. The wire rope 8 is further winded a pulley 7 which is installed on the power generator 3. The air filling-up apparatus will be described hereinafter and is for use in filling up air in each of the floating bodies.

The floating member 2 has a plurality of floaters 9 which are connected to one another by fixing attachments 10. A floor plate 11 is mounted on the floating member 2. The power generator 3, a compressed air steel cylinder 12, and a compressor 13 are mounted on the floor plate 11. The compressor 13 is coupled to the compressed air steel cylinder 12. Furthermore, a shed 14 covers the power generator 3, the compressed air steel cylinder 12, and the compressor 13.

The upper end of the cage 14 is hung or suspended by chains 15 which are suspended from the lower surface of the floor plate 11, and the lower end of the cage 14 is held to fixing chains 17 which are fixed to a fixing concrete 16 sunk to the water bottom or installed on the water bottom.

Figure 3:
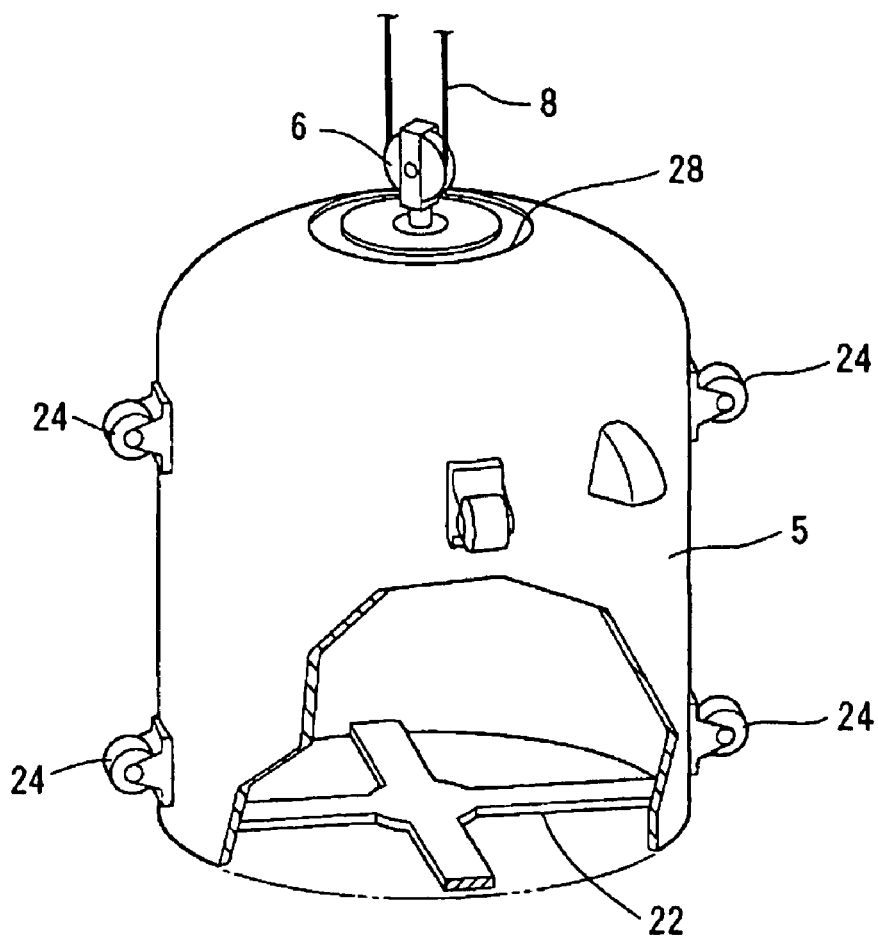
FIG. 3 is a perspective view in condition of notching a part, in a floating body and a electric power generator equipment of the present invention.
Figure 3:
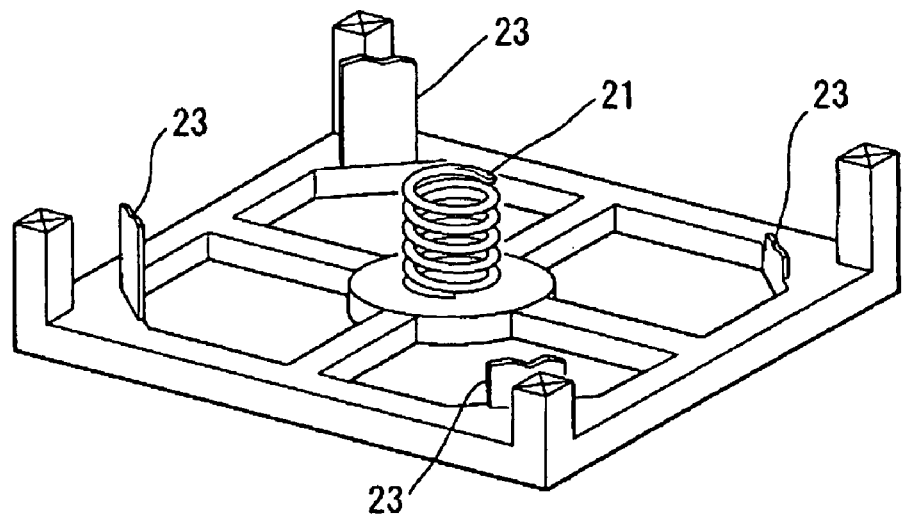

Furthermore, the cage 14 is separated to left and right rooms 19 and 20 in a central portion of the cage 14 by a compartment frame 18 which extends upwardly and downwardly. Springs 21, which support the floating bodies 5 at the lower ends of the floating bodies 5 with cushioning, are installed on the bottom portions of the room 19 and 20, respectively. A spring reception plate 22 for receiving a biasing force of the spring 21, is positioned at the lower end of the floating body 5 as shown in FIG. 3.

Figure 4:
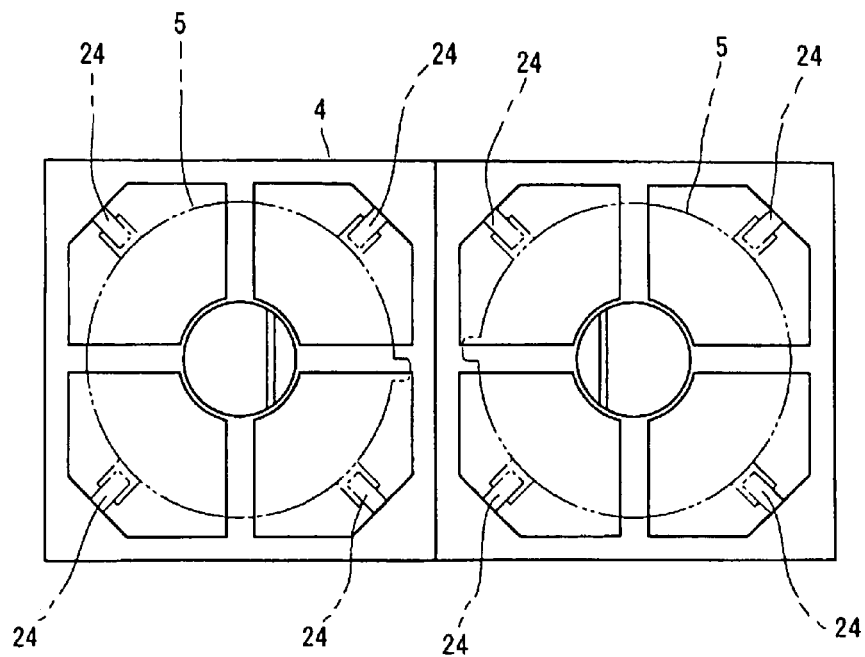
FIG. 4($a$) is a sectional view along A—A line of FIG. 2.
Figure 4:
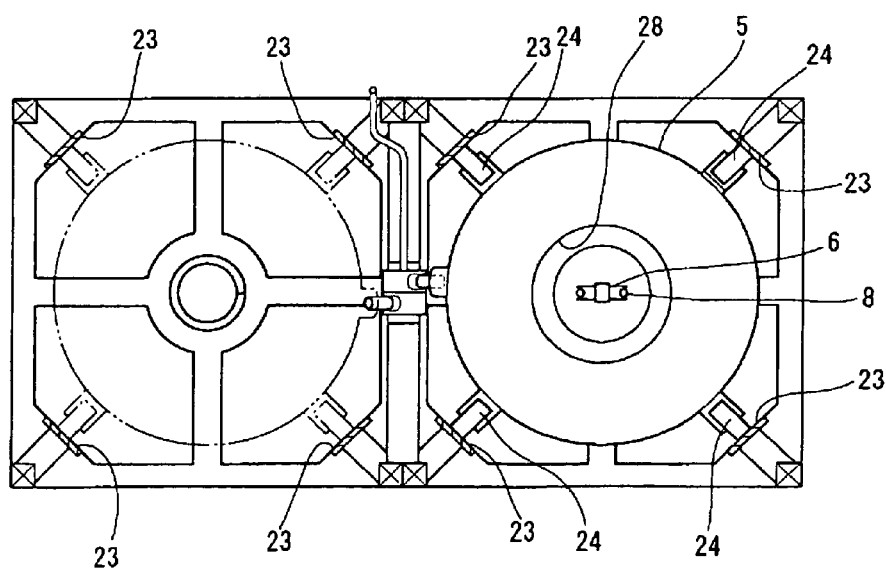
Figure 5:
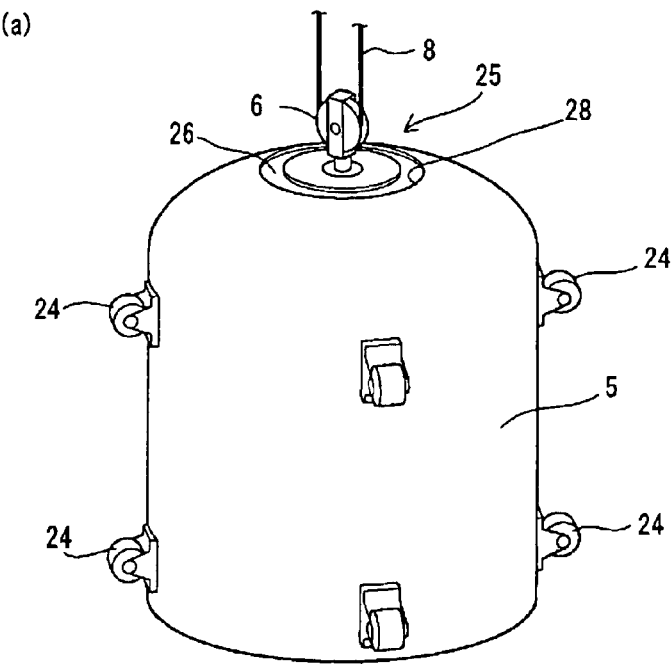
FIG. 5($a$) is a perspective view of a floating body illustrated in FIG. 1.
Figure 5:
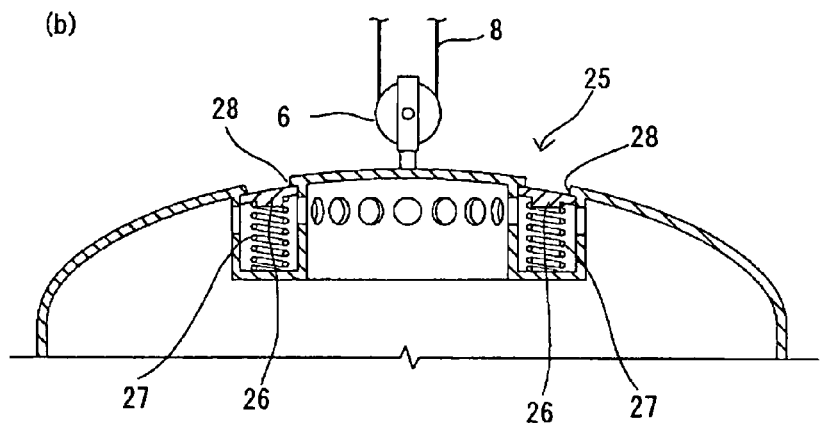
Figure 5:
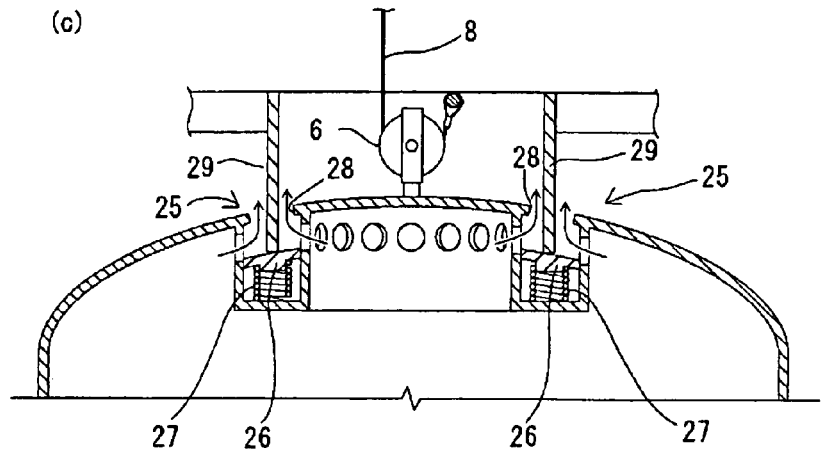

As shown in FIGS. 4(a) and (b), guide plates 23, which extend upwardly and downwardly, are installed at four corners of the left and the right rooms 19 and 20. On the other hand, four rollers 24 are installed on upper portions of outer peripheries of the left and the right floating bodies 5 over entire outer peripheries and are spaced uniformly. The rollers 24 are guided by the guide plate 23. Similarly, four rollers 24 are installed on lower portions of peripheries of the left and the right floating bodies 5 over entire outer peripheries and are spaced uniformly, as shown in FIGS. 5(a) to (c).

An exhausting section 25 is installed on an upper end of the floating body 5. A cover section 26 is biased upwardly by springs 27 and always closes an exhausting opening 28 of the exhausting section 25. When the cover section 26 is pushed downwardly by cover pushing bars 29 which extend from an lower surface of the upper end of the cage 4 to a vertical direction, the cover section 26 is opened.

Figure 6:
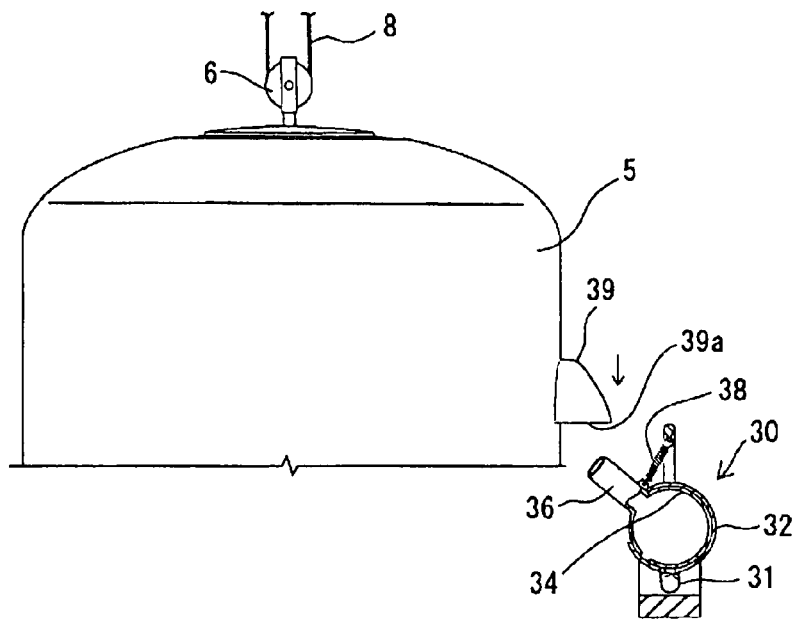
FIG. 6($a$) is a cross-sectional view of an air-filling apparatus in a first position.
Figure 6:
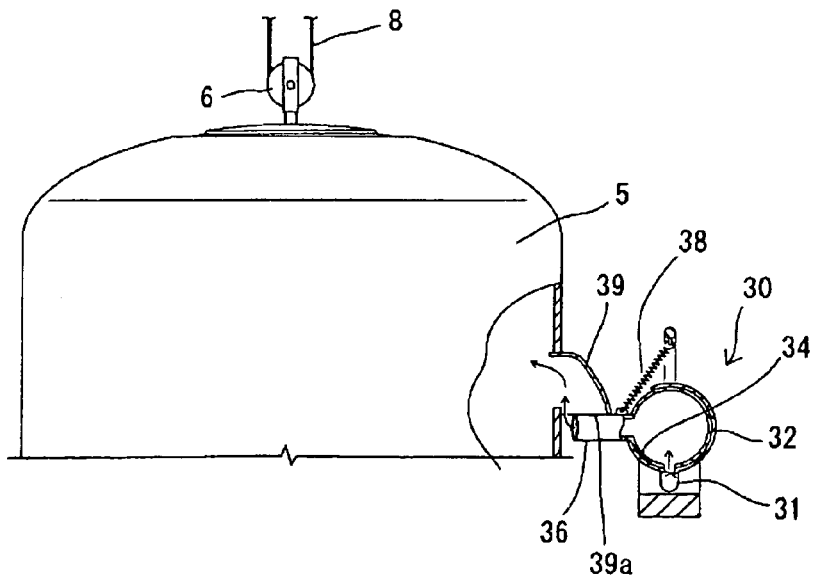
Figure 7:
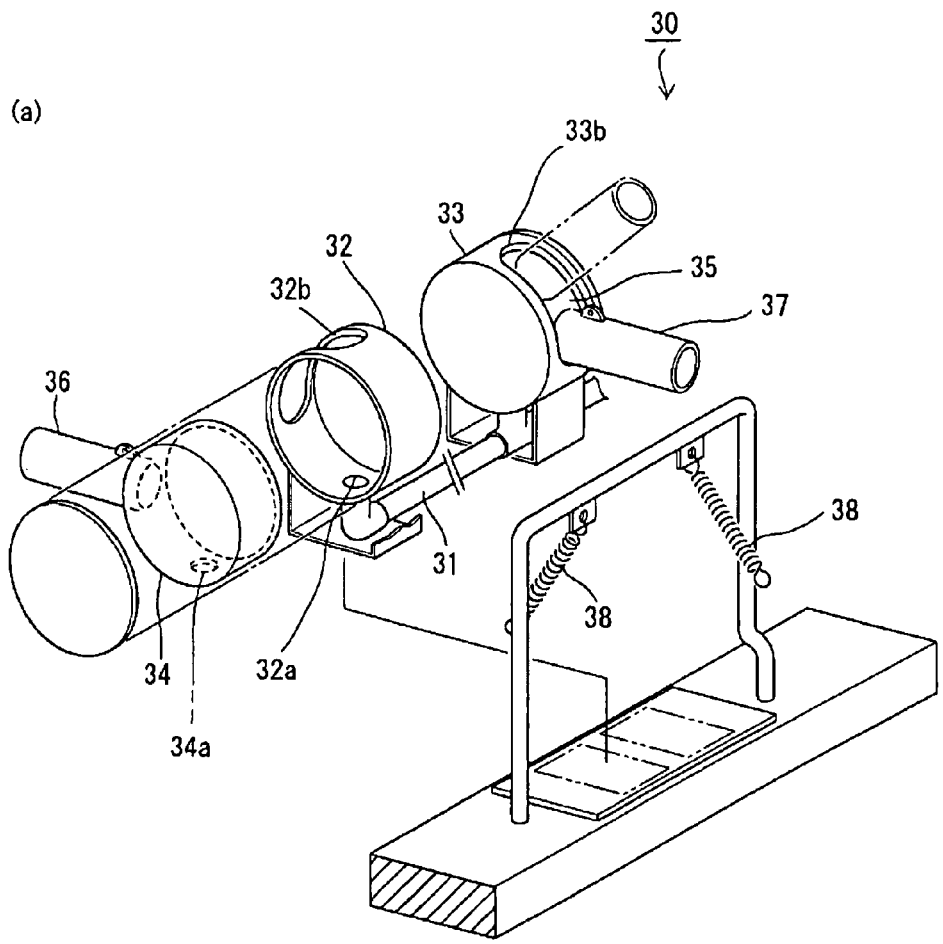
FIG. 7($a$) is a perspective view of the air filling-up apparatus illustrated in each of FIGS. 6($a$) and ($b$)
Figure 7:
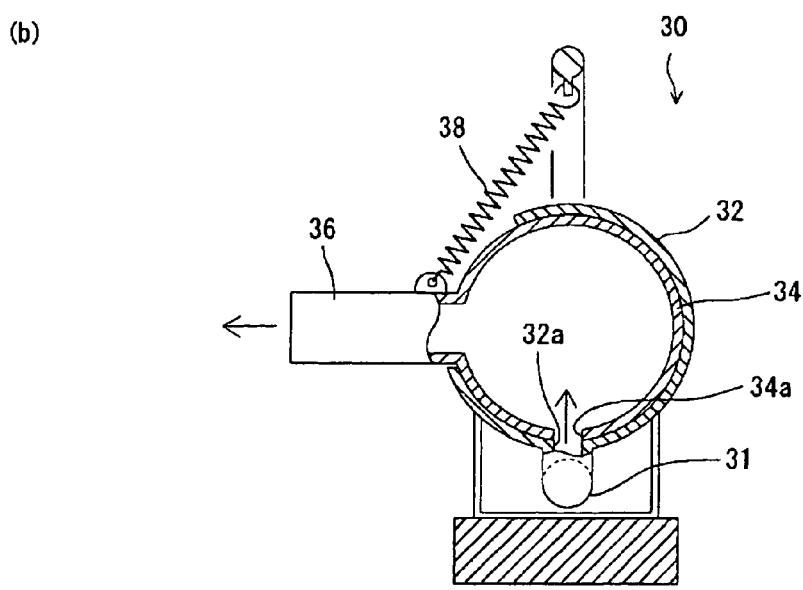

Each of FIGS. 6(a) and (b) and FIGS. 7(a) and (b) shows an air filling-up apparatus 30. In the air filling-up apparatus 30, cylindrical bodies 32 and 33 whose both ends are closed are fixed to top portions of a compressed air pipe 31 which is connected to the compressed air steel cylinder designated by the reference numeral 12 in FIG. 1. Opening portions 32a and 33a (opening portion 33a is not illustrated) for filling up air are formed on the cylindrical bodies 32 and 33, respectively. The cylindrical bodies 32 and 33 are communicate with the compressed air pipe 31 through the opening portions 32a and 33a, respectively. In addition, long holes 32b and 33b are formed on the outer peripheries of the cylindrical bodies 32 and 33 and extend to a direction of the periphery with a predetermined length.

Small cylindrical bodies 34 and 35 each of which is a rotating body are rotatably accommodated in the cylindrical bodies 32 and 33, respectively. The entire inner peripheries of the cylindrical bodies 32 and 33 are contact with the entire outer peripheries of the small cylindrical bodies 34 and 35, respectively, so that the small cylindrical bodies 34 and 35 rotate with being contact with cylindrical bodies 32 and 33.

Opening portions 34a and 35a (opening portion 35a is not illustrated) are formed on the outer peripheries of the small cylindrical bodies 34 and 35 and communicate with the opening portions 32a and 33a of the cylindrical bodies 32 and 33, respectively. Furthermore, air inlet pipes 36 and 37 are fixedly installed at a position apart from the opening portions 34a and 35a of the outer peripheries of the small cylindrical bodies 34 and 35. The air inlet pipes 36 and 37 penetrate into the long holes 32b and 33b of the cylindrical bodies 32 and 33, respectively, and project at a predetermined length. The air inlet pipes 36 and 37 communicate with the small cylindrical bodies 34 and 35, respectively.

The air inlet pipes 36 and 37 are biased to upper sides of the long holes 32b and 33b by return springs 38. At that time, the opening portions 34a and 35a of the small cylindrical bodies 34 and 35 is cut off from the opening portions 32a and 33a of the cylindrical bodies 32a and 33, respectively.

On the other hand, an air taking portions 39 are formed on the outer peripheries of the floating bodies 5 and are contact with the air inlet pipes 36 and 37. The air taking portions 39 have opening portions 39a which are project downwardly. As a result, when the floating bodies 5 go down and the air taking portion 39 is contact with the air inlet pipe 36 to push down the air inlet pipe 36 toward the lower direction of the long hole 32b and when the small cylindrical body 34 rotates in a counterclockwise direction, the opening portion 34a of the small cylindrical body 34 communicates the opening portion 32a of the cylindrical body 32 and the compressed air of the compressed air pipe 31 jets from the air inlet pipe 36. The compressed air flows into the floating body 5 through the opening portion 39a of the air taking pipe 39.

A predetermined amount of air is supplied to the floating body 5 and the floating body 5 goes up on the basis of the buoyant force. The air inlet pipe 36 is pulled by the return spring 38 and the small cylindrical body 34 rotates in a clockwise direction in the drawing. The opening portion 34a of the small cylindrical body 34 deviates from the position of the opening portion 32a of the cylindrical body 32 and the opening portion 34a is closed. The supply of air stops and the air taking pipe 39 comes off the top portion of the air inlet pipe 36.

Figure 8:
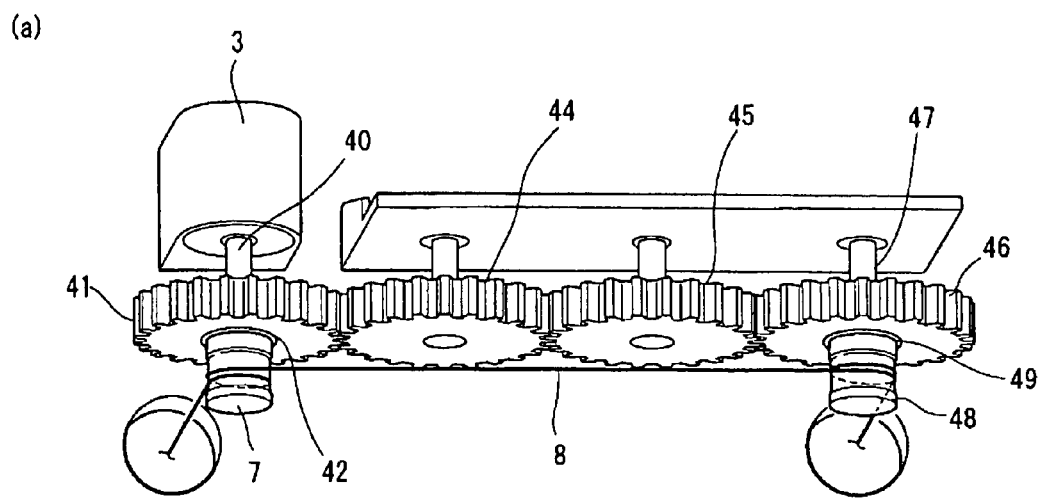
FIG. 8($a$) is a perspective view for illustrating a power generator and gears of FIG. 1.
Figure 8:
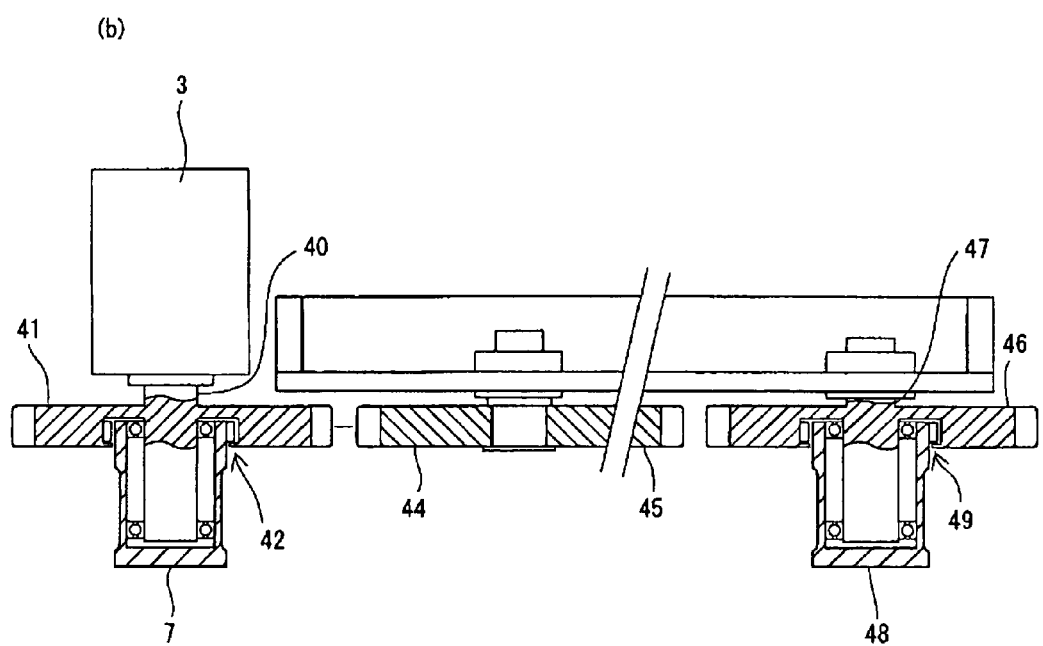
Figure 9:
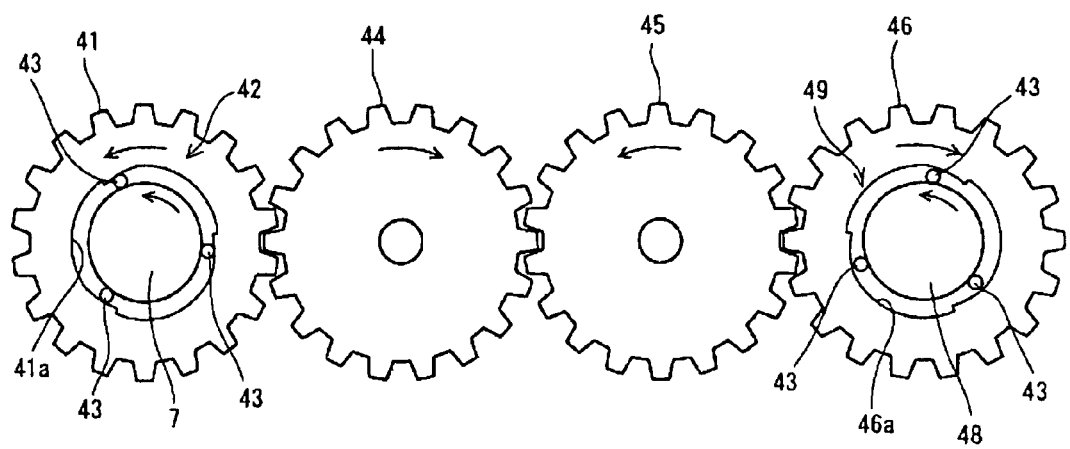
FIGS. 9($a$) and ($b$) are plan views of the gears and an one-way clutch used in the power generator of FIG. 1 during operation thereof.
Figure 9:
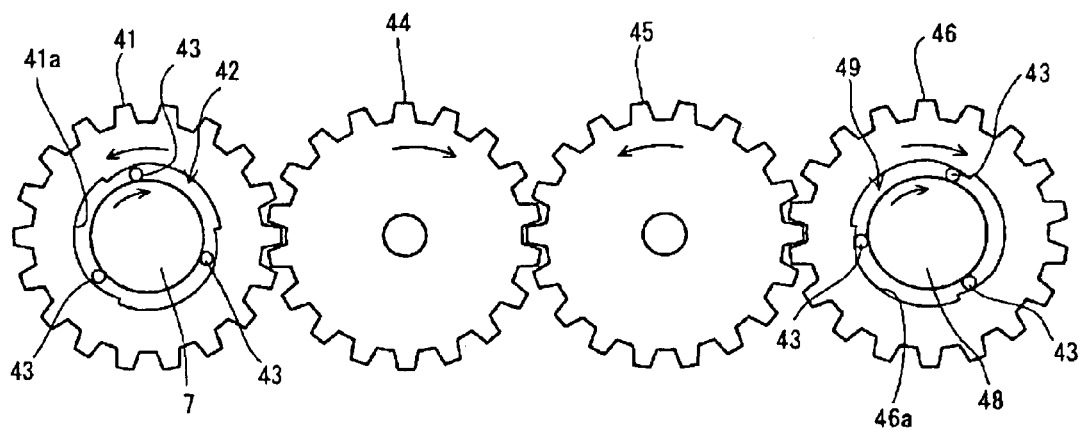

As shown FIGS. 8(a) and (b), a gear 41 is fixedly attached to a rotating axis 40 of the power generator 3 and the pulley 7 is rotatably installed to the rotating axis 40 of the power generator 3. The pulley 7 is caught to the gear 41 through an one-way clutch 42. As shown in FIGS. 9(a) and (b), the one-way clutch 42 makes the gear 41 rotate towards a left direction when the pulley 7 rotates to a left direction (in a counterclockwise direction). When the pulley 7 rotates to a right direction (in a clockwise direction), the one-way clutch 42 does not transmit the rotation to the gear 41.

Description will be made in detail. A hole 41a is formed at a central portion of the gear 41 and the one end of the pulley 7 is engaged into the hole 41a with a predetermined gap. The gap has a taper shape and slightly becomes narrow towards the left rotation direction at three locations. Three rollers 43 are inserted into the gap. When the pulley 7 rotates to the left direction and the rollers 43 are pinched at the narrow locations of the gap, the gear 41 rotates towards a same direction of the rotation of pulley 7. On the other hand, the rotation of the pulley 7 is not transmitted to the gear 41 when the pulley 7 rotates towards the right direction and the rollers 43 are released at wide locations of the gap.

Furthermore, a driven gear 44 engages with the gear 41 and a driven gear 45 engages with the driven 45. A gear 46 engages with the driven gear 45. The gear 46 is rotatably attached to a rotating axis 47 illustrated in FIGS. 8(a) and (b). A pulley 48 is rotatably attached to the rotating axis 47. The pulley 48 is caught to the gear 46 through a one-way clutch 49 which operates in a reverse direction of the one-way clutch 42.

As shown in FIGS. 9(a) and (b), a hole 46a is formed at a central portion of the gear 46 and the one end of the pulley 48 is engaged into the hole 46a with a predetermined gap. The gap has a taper shape and slightly becomes narrow towards the right rotation direction at three locations. Three rollers 43 are inserted into the gap. When the pulley 48 rotates to the right direction and the rollers 43 are pinched at the narrow locations of the gap, the gear 46 rotates towards a same direction of the rotation of pulley 48. On the other hand, the rotation of the pulley 48 is not transmitted to the gear 46 when the pulley 48 rotates towards the left direction and the rollers 43 are released at wide locations of the gap.

Therefore, when the wire rope 8 illustrated in FIG. 1 moves towards the left direction in FIGS. 9(a) and (b) and the pulleys 7 and 48 which are winded to the wire rope 8 rotate towards the left direction, the gear 41 rotates towards the left direction and makes the power generator 3 rotate through the rotating axis 40. At that time, the pulley 48 does not transmit the rotation to the gear 46.

On the other hand, when the wire rope 8 illustrated in FIG. 1 moves towards the right direction in FIGS. 9(a) and (b) and the pulleys 7 and 48 which are winded to the wire rope 8 rotate towards the right direction, the gear 46 rotates towards the right direction and the gear 41 rotates towards the left direction through the driven gears 45 and 44. The gear 41 makes the power generator 3 rotate through the rotating axis 40. At that time, the pulley 7 does not transmit the rotation to the gear 41.

Figure 10:
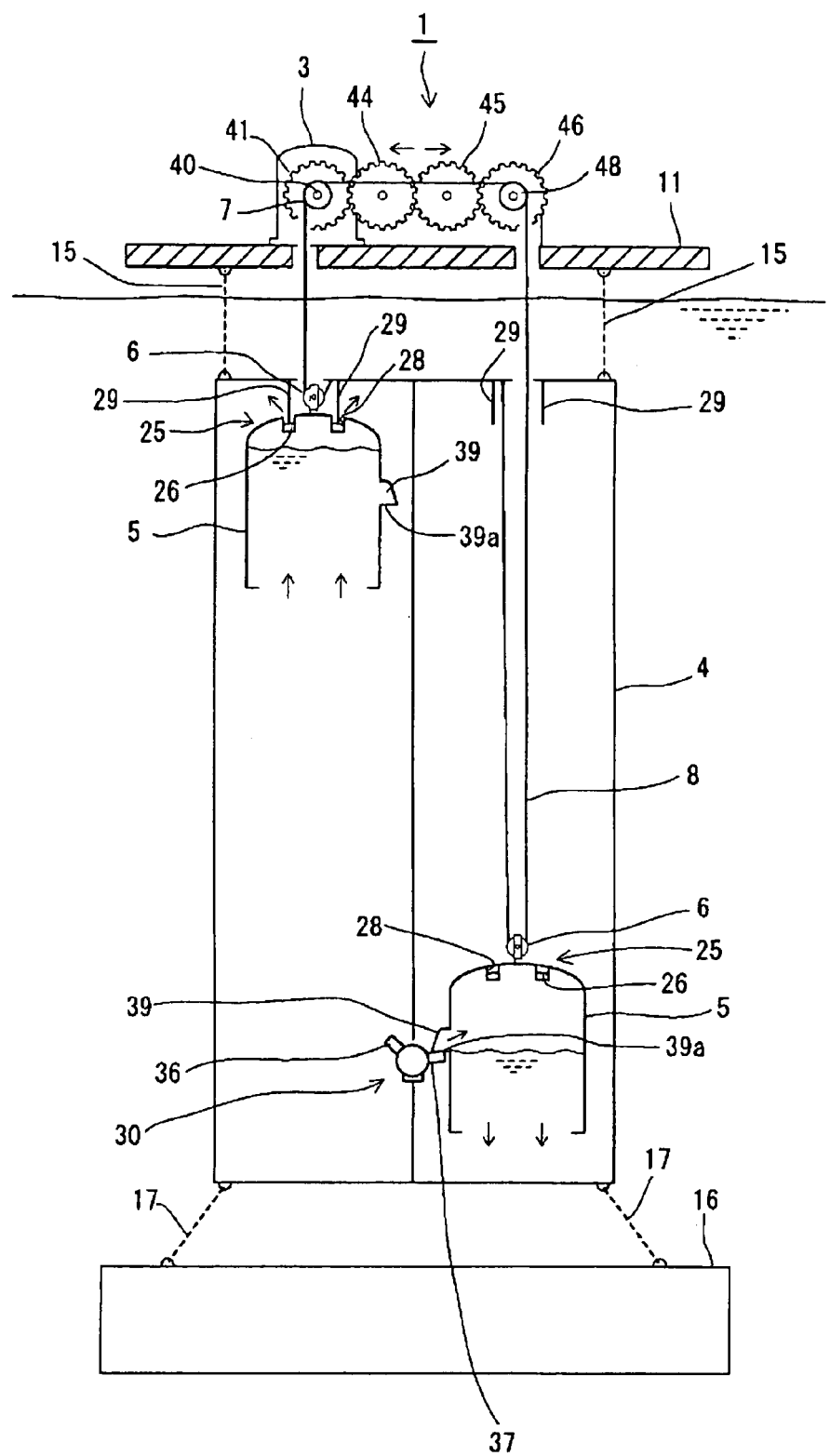
FIG. 10 is a longitudinal sectional view of the electric power generator equipment of the present invention during operation.

Referring to FIG. 10, operation will be made about the electric power generator equipment 1. The electric power generator equipment 1 is positioned at lake, the sea, the impoundment, the reservoir, or the like. Using midnight power, the compressed air is filled up to the compressed air steel cylinder 12 illustrated in FIG. 1 by the compressor 13 illustrated in FIG. 1.

When the right one of the floating bodies 5 drops to the lower end of the cage 4 spontaneously or by external force, the air taking portion 39 of the floating body 5 is contact with the air inlet pipe 37 of the air filling-up apparatus 30 to push down the air inlet pipe 37. The air filling-up apparatus 30 fills up the air supplied from the compressed air steel cylinder 12, from the air inlet pipe 37 to the floating body 5 through the opening portion 39a of the air taking portion 39.

At that time, water of the floating body 5 is exhausted from the lower end of the floating body 5. On the other hand, the cover body 26 is pushed up by the cover pushing bars 29 each of which extends to the vertical direction from the lower surface of the upper portion of the cage 4, in the floating body 5 positioned at a left side of the cage 4. As a result, the exhausting opening 28 is opened so that the air of the floating body 5 is exhausted.

When the air is filled up in the right floating body 5 and the air is exhausted from the left floating body 5, the left and the right floating bodies 5 lose the balances. The right floating body 5 goes up and the left floating body 5 goes down. At that time, the air inlet pipe 37 rotates towards the left direction by the bias force of the return springs 38 illustrated in FIGS. 7(a) and (b) when the air taking portion 39 of the right floating body 5 goes up. As a result, the air filling-up apparatus 30 stops filling up the air.

On the other hand, the cover body 26 is slightly released from the pushdown forces based on the cover pushing bars 29, in the left floating body 5. When the cover pushing bars 29 come off the cover body 26, the exhausting opening 28 is closed.

By the wire rope 8 which is winded to the pulleys 6 of the left and the right floating bodies 5 and which is winded to the pulleys 7 and 48, the pulleys 7 and 48 rotate towards the left direction and the pulley 7 makes the power generator 3 rotate through the gear 41.

When the left floating body 5 drops and comes to the lower end of the cage 4, the air taking portion 39 of the floating body 5 is contact with the air inlet pipe 36 of the air filling-up apparatus 30 to push up the air inlet pipe 36. The air filling-up apparatus 30 fills up the air from the air inlet pipe 36 to the floating body 5 through the opening portion 39a of the air taking portion 39.

At that time, water of the floating body 5 is exhausted from the lower end of the floating body 5. On the other hand, the cover body 26 is pushed down by the cover pushing bars 29 each of which extends to the vertical direction from the lower surface of the upper portion of the cage 4, in the floating body 5 positioned at a right side of the cage 4. As a result, the exhausting opening 28 is opened so that the air of the floating body 5 is exhausted.

When the air is filled up in the left floating body 5 and the air is exhausted from the right floating body 5, the left and the right floating bodies 5 lose the balances. The left floating body 5 goes up and the right floating body 5 goes down. At that time, the pulleys 7 and 48 rotate towards the right direction by the wire rope 8 which is winded to the pulleys 6 of the left and the right floating bodies 5 and which is winded to the pulleys 7 and 48. The pulley 48 makes the gear 46 rotate towards the right direction. The gear 46 makes the gear 41 rotate towards the left direction through the driven gears 45 and 44. The gear 41 makes the power generator 3 rotate through the rotating axis 40.

Similarly, when the left and the right floating bodies 5 continues to go up and down, the power generator 3 continues to rotate in order to generate the electric power.

As described above, it is unnecessary for the electric power generator equipment 1 of the present invention to have the water bath and it is possible to reduce the cost inasmuch as the electric power generator equipment 1 is capable of being positioned at lake, the sea, the impoundment, the reservoir, or the like. Furthermore, it is possible to ensure the sufficient depth of water without the constructive definition of height and it is possible to efficiently carry out the power generation. In addition, it is unnecessary for each member configuring the cage 4 to have high strength inasmuch as the electric power generator equipment 1 of the present invention has the structure in which the cage 4 is suspended. As a result, it is possible to further reduce the cost.

Furthermore, it is possible to make the rotating axis 40 of the power generator 3 rotate towards a predetermined direction and it is possible to efficiently carry out the power generation, inasmuch as the power generator 3 has the one-way clutches 42 and 49.

Inasmuch as the compressed air steel cylinder 12 is connected to the air filling-up apparatus 30, it is possible to supply the air from the compressed air steel cylinder 12 to the air filling-up apparatus 30.

Inasmuch as the compressor 13 is connected to the compressed air steel cylinder 12, it is possible to supply the air from the compressor 13 to the compressed air steel cylinder 12.

In addition, the biased small cylindrical bodies 34 and 35 always close the opening portions 32a and 33a for filling up the air. When the small cylindrical bodies 34 and 35 rotate in accordance with drops of the floating bodies 5, the opening portions 32a and 33a are opened so that the air is filled up to the floating bodies 5. As a result, it is possible to automatically fill up the air to the floating bodies 5 in accordance with the drops of the floating bodies 5.

Figure 11:
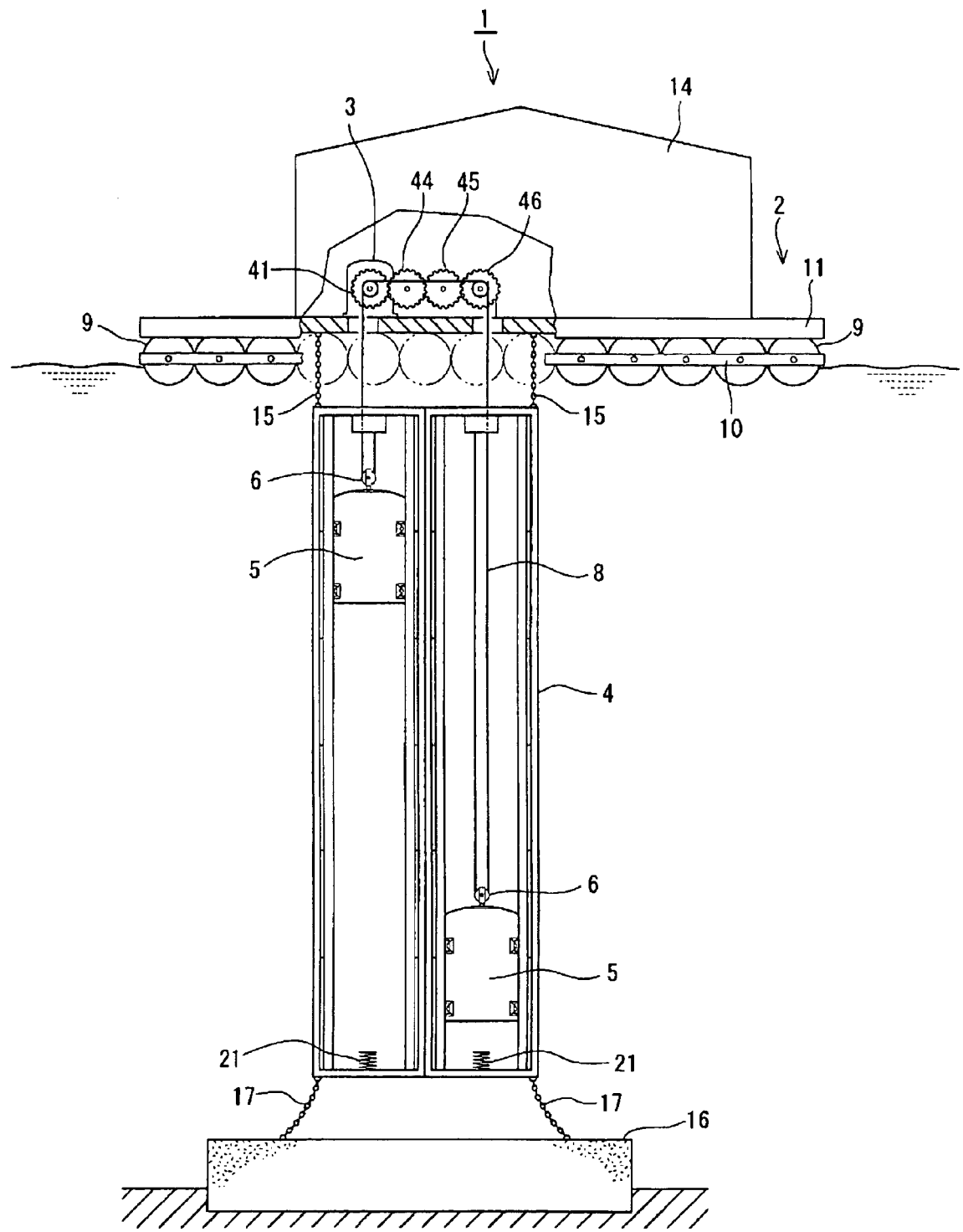
FIG. 11 is a sectional view of the electric power generator equipment of the present invention, in a condition of notching a part, during a high water level condition.
Figure 12:
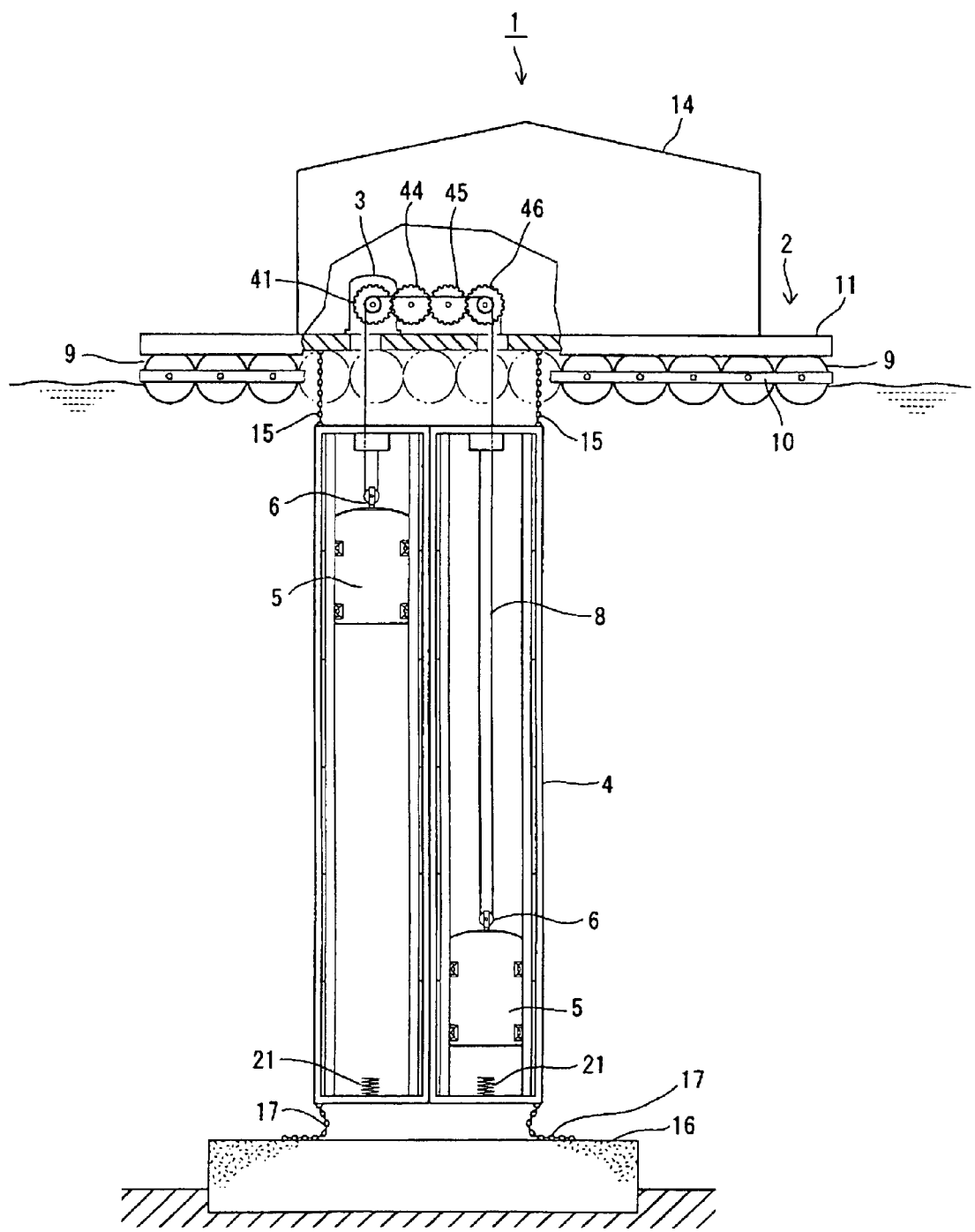
FIG. 12 is a sectional view of the electric power generator equipment of the present invention, in a condition of notching a part, during a low water level condition.
Figure 13:
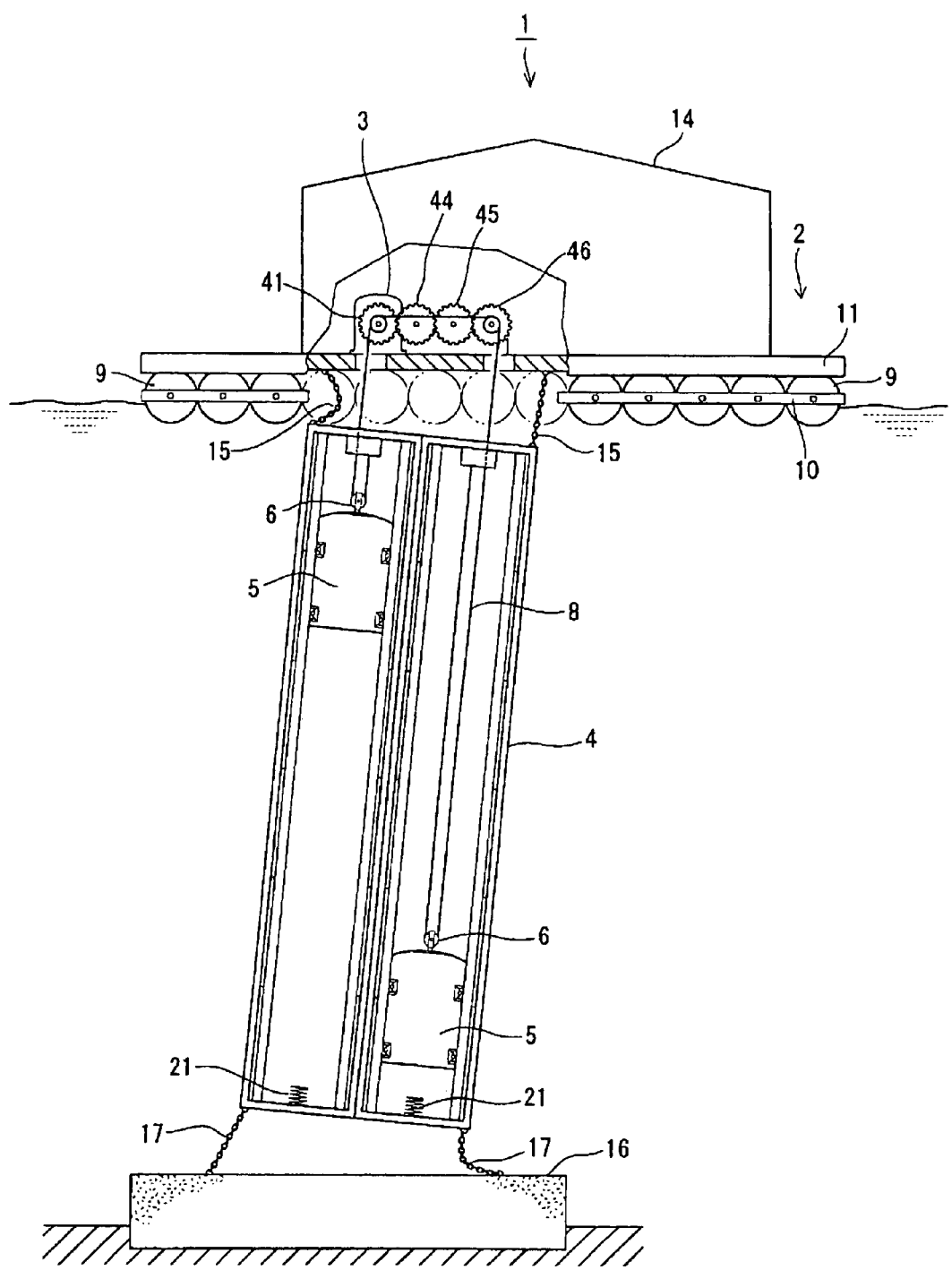
FIG. 13 is a sectional view of the electric power generator equipment of the present invention, in a condition of notching a part, during a condition of water flow.

FIGS. 11 to 13 show movement, position, or attitude of the electric power generator equipment 1 with respect to the variation of the water surface, when the electric power generator equipment 1 is positioned at lake, the sea, the impoundment, the reservoir, or the like. FIG. 11 shows movement, position, or attitude of the electric power generator equipment 1 when the water surface goes up. Although the cage 4 comes off the fixing concrete 16 of the water bottom upwardly, the ascent of the water surface has no effect on the operation of the electric power generator equipment 1 inasmuch as the chains 17 hold the cage 4.

FIG. 12 shows movement, position, or attitude of the electric power generator equipment 1 when the water surface goes down. Although the cage 4 moves closer to the fixing concrete 16 of the water bottom or is positioned on the fixing concrete 16 of the water bottom, the descent of the water surface has no effect on the operation of the electric power generator equipment 1.

FIG. 13 shows movement, position, or attitude of the electric power generator equipment 1 when flow exists in the water. Although the cage 4 is inclined on the basis of the water flow, the cage 4 is not washed away inasmuch as the fixing concrete 16 holds the cage 4. Even if the cage 4 is inclined, it is possible to make the floating bodies 5 move upwardly and downwardly. The water flow has no effect on the operation of the electric power generator equipment 1.

Figure 14:
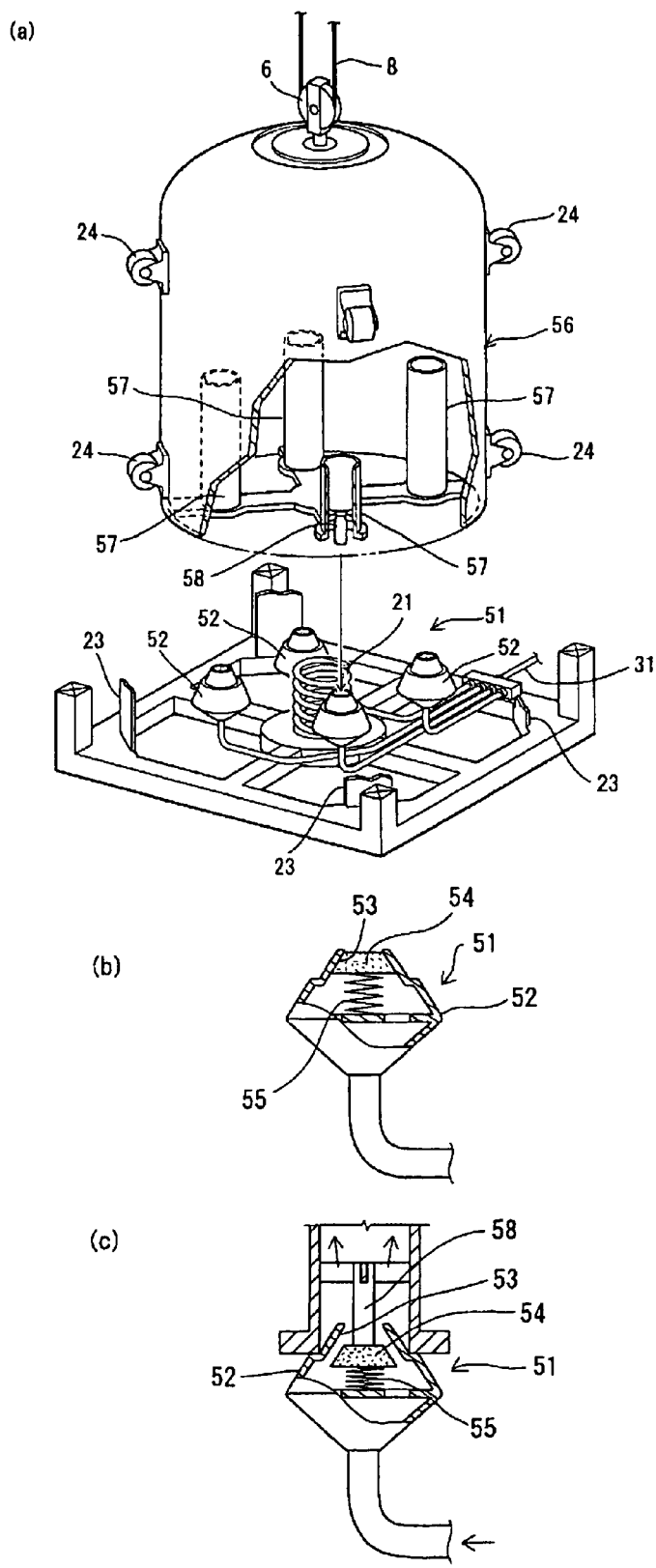
FIG. 14($a$) is a perspective view of another example of an air filling-up apparatus.

FIGS. 14(a) to (c) show another air filling-up apparatus 51 used in the present invention instead of the air filling-up apparatus 30 illustrated in FIGS. 6(a) and (b). The air filling-up apparatus 51 has four truncated cone cylindrical bodies 52. The truncated cone cylindrical bodies 52 are fixedly attached to the top portion of the compressed air pipe 31 which is connected to the compressed air steel cylinder 12 illustrated in FIG. 1. The truncated cone cylindrical bodies 52 communicate with the compressed air pipe 31. An opening portion 53 for filling up the air is formed on a head portion of each truncated cone cylindrical body 52. The opening portion 53 is always closed by a cover body 54 which is biased from a lower side by return springs 55.

On the other hand, four air taking pipes 57 corresponding to the air filling-up apparatus 51 have both opening ends and are positioned at a bottom portion of a floating body 56. The air taking pipes 57 extend upwardly and are attached at the positions corresponding to the truncated cone cylindrical bodies 52, instead of air taking portion 39 illustrated in FIGS. 6(a) and (b) of the floating body 5 illustrated in FIG. 1. A cover pushing bar 58 which extends downwardly is installed on a central portion of each air taking pipe 57.

When the floating body 56 drops and each air taking pipe 57 drops on the truncated cone cylindrical bodies 52 and the cover pushing bar 58 push down the cover body 54 of each truncated cone cylindrical body 52, the air of the compressed air pipe 51 is supplied from the opening portion 53 to the floating body 56 through each air taking pipe 57.

When a predetermined amount air is supplied to the floating body 56 and the floating body 56 goes up in accordance with the buoyant force, the cover pushing bar 58 releases the pushdown force of the cover body 54 of each truncated cone cylindrical body 52 and the cover body goes up by the bias force of the return spring 55. As a result, the cover body 54 closes the opening portion 53.

Figure 15:
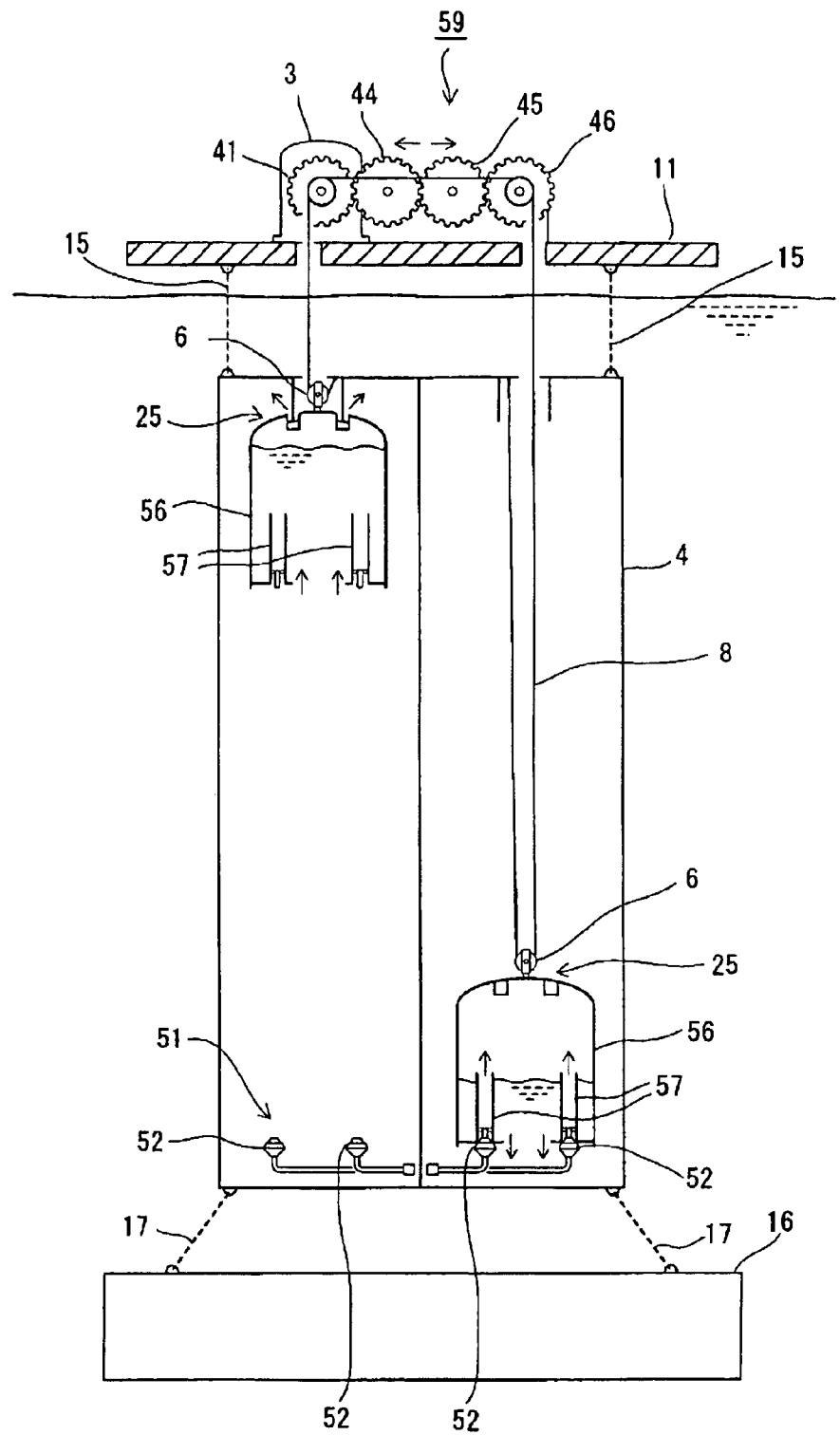
FIG. 15 is a longitudinal sectional view of the electric power generator equipment using the air filling-up apparatus shown in each of FIGS. 14($a$) to ($c$)

FIG. 15 shows an electric power generator equipment 59 using the air filling-up apparatus 51. In FIG. 15, the air is filled up to the right floating body 56 by the air filling-up apparatus 51. When the air is filled up from the air filling-up apparatus 51 to the floating body 56, the water of the floating body 56 is exhausted from the lower end of the floating body 56. At that time, the left floating body 56 exists at an upper end position and exhausts the air of the floating body 56 from the exhausting portion 25.

In the electric power generator apparatus 59, the left and the right floating bodies 56 go up and down in a similar manner described in conjunction to the electric power generator equipment 1 illustrated in FIG. 1. As a result, the power generator 3 generates the electric power by rotation. It is possible to obtain the similar effect described in conjunction to the electric power generator equipment 1.

FIGS. 16(a) and (b)-show still another air filling-up apparatus 61 used in the present invention instead of the air filling-up apparatus 30 illustrated in FIGS. 6(a) and (b). The air filling-up apparatus 61 has four air inlet pipes 62. The air inlet pipes 62 are installed at the top portion of the compressed air pipe 31 which is connected to the compressed air steel cylinder 12 illustrated in FIG. 1. Each of the air inlet pipes 62 extends from the bottom portion of the cage 4 to the vertical direction. A direction-changing valve 63 is positioned near the top portion of the compressed air pipe 31 and is always closed. Furthermore, a changing lever 65 is installed which is for use in changing the direction-changing valve 63.

The top end of the changing lever 65 extends towards the left and the right floating bodies 64. The changing lever 65 operates in accordance with drops of the floating bodies 64.

When the left floating body 56 drops and the lower end of the left floating body 56 pushes down the top end of the changing lever 65, the direction-changing valve 63 is changed and the compressed air of the compressed air pipe 31 is supplied to the floating body 64 through each air inlet pipe 62.

When a predetermined amount air is supplied to the floating body 64 and the floating body 64 goes up in accordance with the buoyant force, the changing lever 65 returns to a neutral position and the direction-changing valve 63 closes a flow path. As a result, the supply of the compressed air is cut off. The air filling-up apparatus 61 carries out a similar operation described in conjunction to the left floating body 64, with respect to the right floating body 64.

Figure 16:
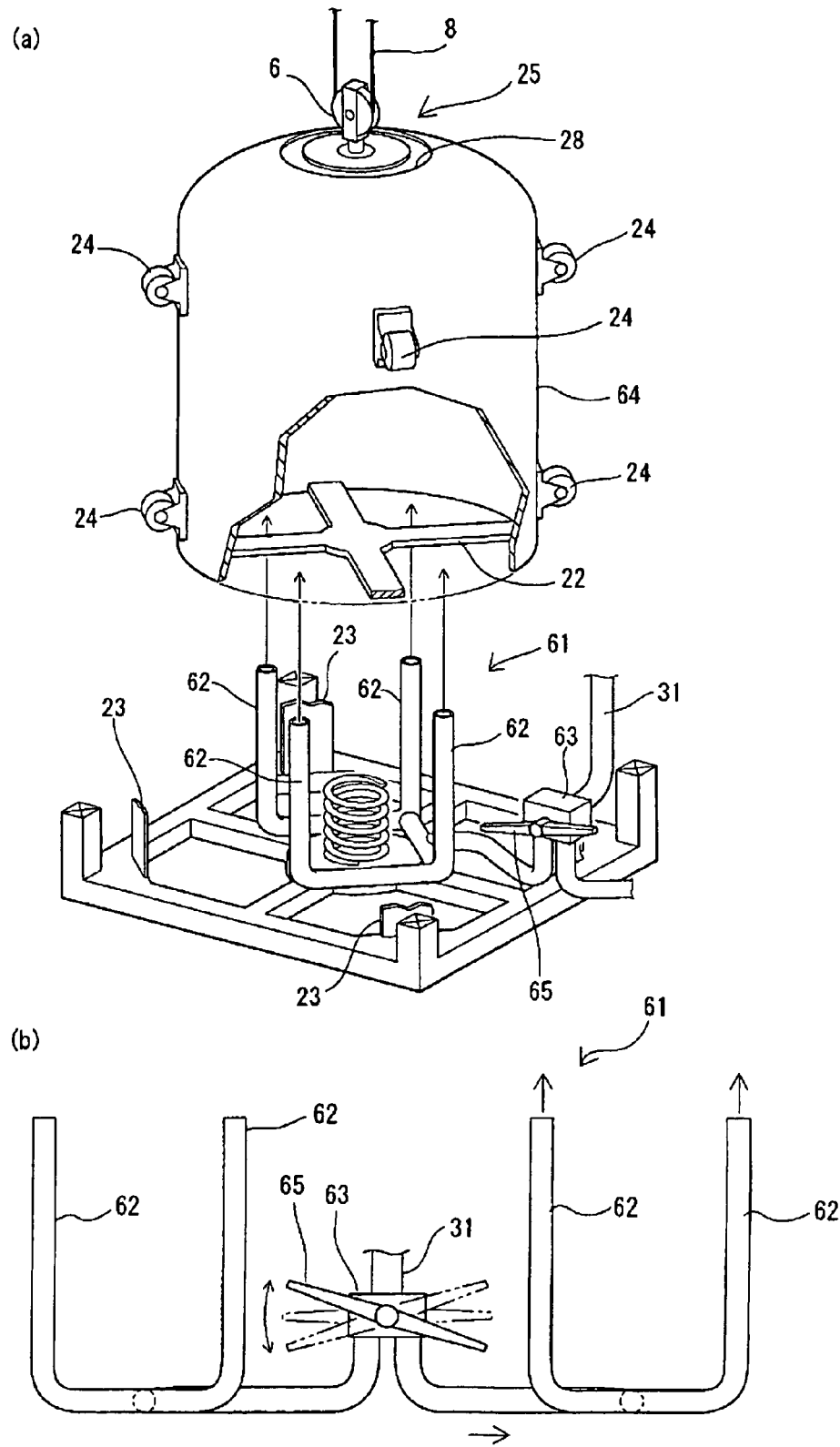
FIG. 16($a$) is a perspective view of still another example of an air filling-up apparatus.
Figure 17:
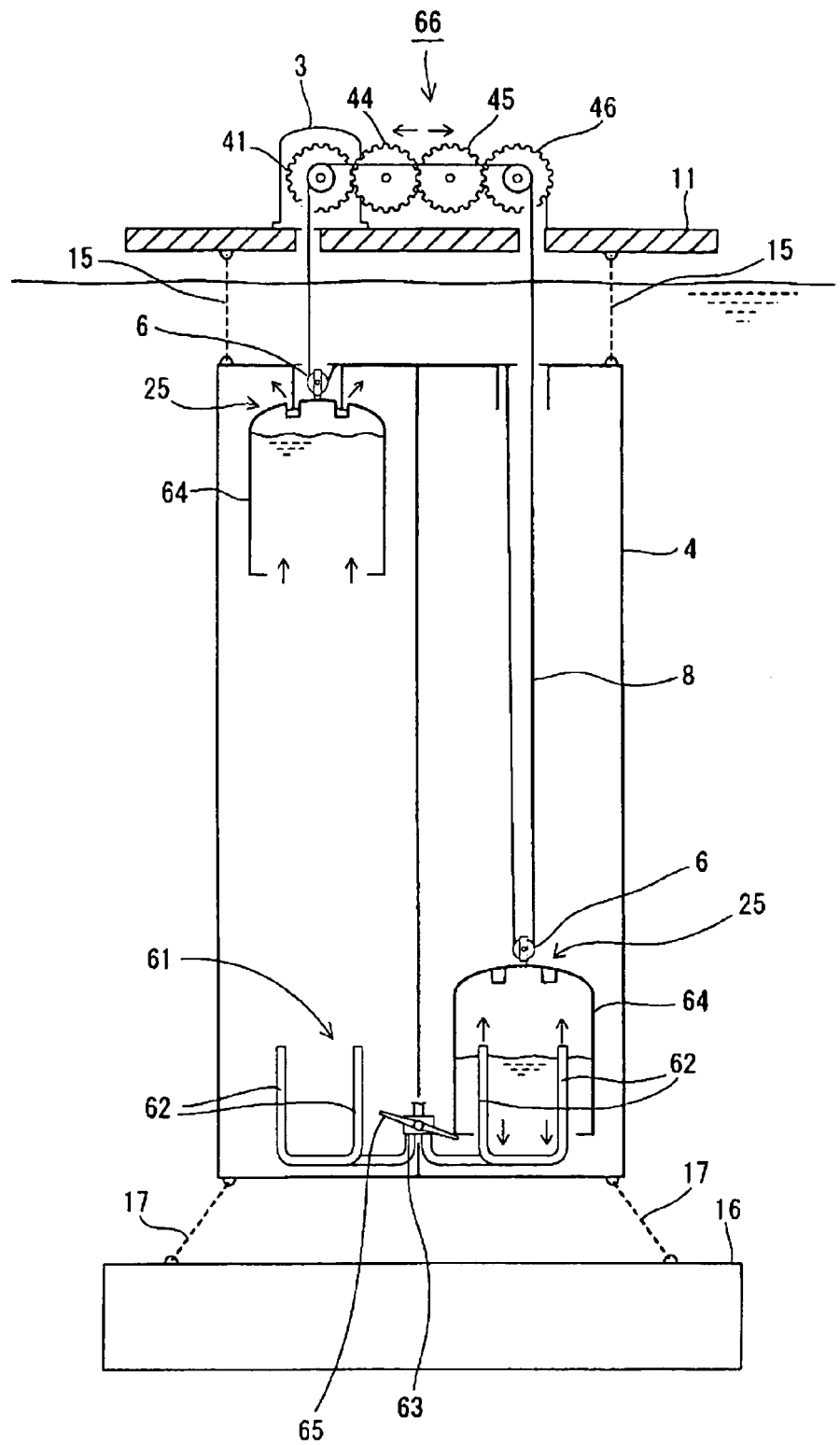
FIG. 17 is a longitudinal sectional view of the electric power generator equipment using the air filling-up apparatus shown in each of FIGS. 16($a$) and ($b$)

FIG. 17 shows an electric power generator equipment 66 using the air filling-up apparatus 61. In FIG. 16, the air is filled up to the right floating body 64 by the air filling-up apparatus 61. When the air is filled up from the air filling-up apparatus 61 to the floating body 64, the water of the floating body 64 is exhausted from the lower side of the floating body 64. At that time, the left floating body 64 exists at an upper end position and exhausts the air of the floating body 64 from the exhausting portion 25.

In the electric power generator apparatus 66, the left and the right floating bodies 64 go up and down in a similar manner described in conjunction to the electric power generator equipment 1 illustrated in FIG. 1. As a result, the power generator 3 generates the electric power by rotation. It is possible to obtain the similar effect described in conjunction to the electric power generator equipment 1.

What I claim is:

1. An electric power generator equipment comprising a floating member for floating on a water surface, a power generator installed on an upper surface of said floating member, a cage suspended from a lower end of said floating member and held to a water bottom, a pair of floating bodies positioned in said cage which is separated, a wire rope whose both ends are fixed to said cage, said wire rope being winded to a pulley installed an end portion of each floating body and being winded to a pulley installed on said power generator, and an air filling-up apparatus for filling up air to each of said floating bodies, wherein:

said air filling-up apparatus fills up the air to the floating body when said floating body is positioned at a lower portion of said cage;

the air being exhausted from said floating body when said floating body is positioned at an upper portion of said cage;

the pair of floating bodies alternatively going up and down continuously; and said power generator rotating to generate an electric power by movement of said wire rope based on ascent and descent of said floating bodies.

2. An electric power generator equipment as claimed in claim 1, wherein said power generator has an one-way clutch.

3. An electric power generator equipment as claimed in claim 1, wherein a compressed air steel cylinder is connected to said air filling-up apparatus.

4. An electric power generator equipment as claimed in claim 3, wherein a compressor is connected to said compressed air steel cylinder.

5. An electric power generator equipment as claimed in claim 1, wherein:

said air filling-up apparatus has an opening portion for use in filling up air that is always closed by a biased rotating body;

said opening portion opening when said rotating body rotates in accordance with drop of said floating body; and said air filling-up apparatus filling up the air to said floating body.

6. An electric power generator equipment as claimed in claim 1, wherein:

said air filling-up apparatus has an opening portion for use in filling up air that is always closed by a cover body which is biased upwardly;

said opening portion opening when a cover pushing bar extending from said floating body to a vertical direction pushes down said cover body in accordance with drop of said floating body; and said air filling-up apparatus filling up the air to said floating body.

7. An electric power generator equipment as claimed in claim 1, wherein:

said air filling-up apparatus has an flow path for use in filling up air that is always closed by a direction-changing valve;

said flow path opening when a changing lever of said direction-changing valve is changed in accordance with drop of said floating body; and said air filling-up apparatus filling up the air to said floating body.

8. An electric power generator equipment as claimed in claim 1, wherein:

said floating body comprises an exhausting portion positioned at an upper end of said floating body for exhausting the air from said floating body;

said exhausting portion having an exhausting opening which is always closed by a cover body which is biased upwardly;

said exhausting opening being opened when a cover pushing bar extending from a lower surface of an upper portion of said cage to a vertical direction pushes down said cover body in accordance with ascent of said floating body; and the air being exhausted from said floating body.

* * * * *